C. B. ORR.
COMBINED STEAM AND ACID SPLICE CURE FOR INNER TUBES.
APPLICATION FILED AUG. 27, 1917.

1,317,665. Patented Sept. 30, 1919.

Inventor.
Clifford B. Orr;

Witnesses:

By his Attorney.

UNITED STATES PATENT OFFICE.

CLIFFORD B. ORR, OF AKRON, OHIO, ASSIGNOR TO THE GOODYEAR TIRE & RUBBER COMPANY, OF AKRON, OHIO, A CORPORATION OF OHIO.

COMBINED STEAM AND ACID SPLICE CURE FOR INNER TUBES.

1,317,665.     Specification of Letters Patent.     Patented Sept. 30, 1919.

Application filed August 27, 1917. Serial No. 188,350.

*To all whom it may concern:*

Be it known that I, CLIFFORD B. ORR, a citizen of the United States, residing at Akron, in the county of Summit and State of Ohio, have invented new and useful Improvements in Combined Steam and Acid Splice Cures for Inner Tubes, of which the following is a specification.

My present invention relates to a method for splicing the butt ends of inner tubes for vehicle tires of the pneumatic type.

A common practice in the manufacture of inflatable tires is to splice the butt ends of the tubes by means of an acid, wherein the acid is applied between the overlapped ends and the tube is then wrapped and laid away for a certain time in a temperature governed room to allow the acid to cure the splice.

Another common method of splicing butt ends of inner tubes is to interpose between the butt ends of the tube a strip of soft rubber, the tube being later inflated and then vulcanized and a firm joint or union thus produced.

I find after extensive experimenting that both of the above methods fail when employed for splicing a tube that is to be inflated within a mold and steam vulcanized. Where the acid splice is used, I find the splice becomes overcured due to the curing acid itself and the action of the steam. In the soft rubber splice I find that, upon inflation of the tube, the splice separates before the soft rubber has been sufficiently cured by the action of the steam to form a firm union or joint.

The principal object of this invention is to combine the above methods of splicing thereby employing the meritorious points of the combined acid and soft rubber cures to produce a superior splice.

The above and additional objects of a similar nature, which will be hereinafter more specifically treated, are preferably accomplished by such means as are illustrated in the accompanying drawings, described in the following specification, and then more particularly pointed out in the claims which are appended hereto and form a part of this application.

Figure 1:
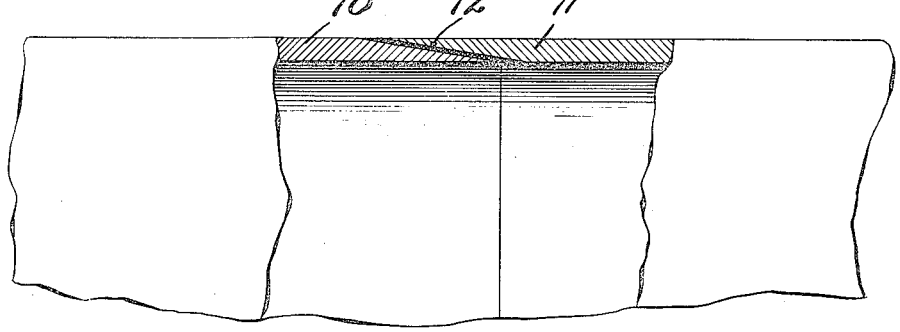
Figure 2:
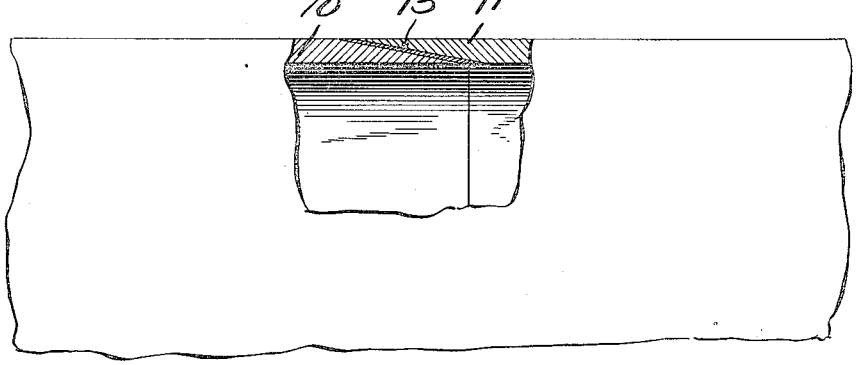

With reference to the drawings, wherein there has been illustrated a preferred embodiment of the invention as it is reduced to practice, and throughout the several views of which similar reference numbers designate corresponding parts:

Figure 1 is a sectional elevation showing the acid splice method;

Fig. 2, a similar view illustrating the soft rubber splice method; and

Figure 3:
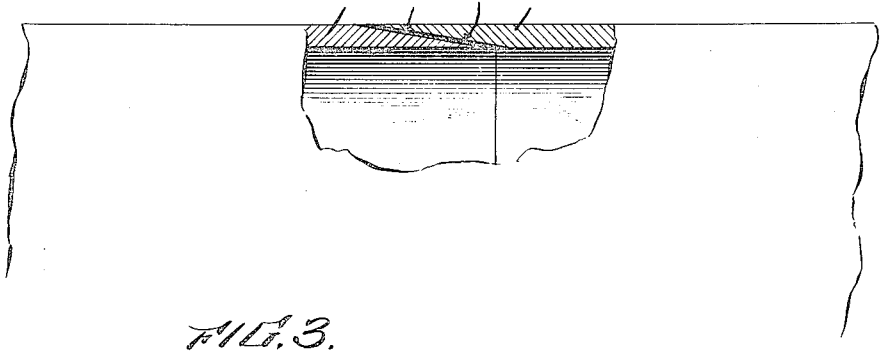

Fig. 3 is also a similar view showing my improved form of splice.

In carrying out my invention I intend to follow the usual custom of forming the tube on a hollow mandrel, cutting to required weight and length and skiving the ends, which steps I have not illustrated in the drawings. In Fig. 1 of the drawings the numerals 10 and 11 designate the skived butt ends of the tube and 12 the acid interposed between the butt ends to cure the splice. In Fig. 2 the numeral 13 designates the application of the soft rubber to form the splice, which is afterward "cured" by the steam vulcanization method.

Fig. 3 illustrates the method which I intend to follow in manufacture wherein I employ the quick curing properties of acid 12' for about one-third of the splice distance and a strip of soft rubber 13' for the remainder. When the tube is placed in the mold and inflated the acid splice will hold the butt ends of the tube together permitting the remainder of the splice to become thoroughly vulcanized by the action of the steam.

With my construction it will be observed that by using the combination of the acid and soft rubber splices I overcome the difficulties experienced by the overcuring of the acid splice and the separation of the soft rubber upon inflation in the mold before it has time to cure sufficiently to form a perfect joint. The inner one-third of the splice may become overcured but the remaining part of the splice will be thoroughly cured and a perfect union will be obtained.

It will be further clearly seen that although I have throughout the drawings illustrated a form of splice known as a skived splice, I could also form an effective seal or joint where a lap joint or any other form of joint is required, and do not wish to be limited to the particular form of joint illustrated.

It is to be further understood where reference is made to soft rubber, I mean, preferably, pure rubber compounded with very little sulfur or other ingredients usually used in connection with the compounding of rubber.

What I claim is:

1. An improvement in the method of splicing inner tubes for pneumatic tires which consists in producing a rapid vulcanization of a portion of the splice and curing the remaining portion of the splice by a relatively slow vulcanization.

2. An improvement in the method of splicing inner tubes for pneumatic tires consisting of interposing a strip of vulcanizable material between the lapped ends of the tube for the major portion of the splice and interposing between the remainder of said splice an agent to cause a quick vulcanization of that portion of said splice to form a retaining means while the major portion of said splice is being vulcanized.

3. An improvement in the method of splicing inner tubes for pneumatic tires consisting of interposing a strip of vulcanizable material between the lapped ends of the tube for the major portion of the splice and uniting the remaining portion of the splice by a quick acid cure to form a retaining means while the major portion of said splice is being united by vulcanization of said strip of vulcanizable material.

4. An improvement in forming the joint between the ends of inflatable tubes for pneumatic tires consisting of the following steps: *a.* Interposing between the lapped ends of the tube a thin sheet of uncured rubber for the major portion of the splice. *b.* The application of a quick vulcanizing agent between the lapped ends of the remainder of the splice. *c.* Inflating said tube within a mold and subjecting to a heat of sufficient time to cause a thorough vulcanization of said major portion of the splice and the tube.

5. A method of splicing inner tubes, which consists in applying vulcanizable material to a portion of the splice, and treating the remainder of the splice to hold together the abutting ends of the tube while the splice is being united by vulcanization of the vulcanizable material.

In testimony whereof I have signed my name in the presence of two subscribing witnesses.

CLIFFORD B. ORR.

Witnesses:
N. E. KIMBALL,
R. S. TROGNER.